US 8,145,071 B2

(12) United States Patent
Tanaka et al.

(10) Patent No.: US 8,145,071 B2
(45) Date of Patent: Mar. 27, 2012

(54) ELECTRICAL-DISPERSION COMPENSATING APPARATUS, OPTICAL RECEIVING APPARATUS, AND OPTICAL RECEIVING METHOD (75) Inventors: Toshiki Tanaka, Kawasaki (JP); Yuichi Akiyama, Kawasaki (JP); Tomoo Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 752 days.

(21) Appl. No.: 12/230,247

(22) Filed: Aug. 26, 2008

(65) Prior Publication Data
US 2009/0116844 A1 May 7, 2009

(30) Foreign Application Priority Data

Nov. 7, 2007 (JP) .................................. 2007-289859

(51) Int. Cl.
*H04B 10/06* (2006.01)
*H04B 10/18* (2006.01)
(52) U.S. Cl. ...................................................... 398/209
(58) Field of Classification Search .................... 398/209
See application file for complete search history.

(56) References Cited

U.S. PATENT DOCUMENTS

| 6,807,321 | B2 |  | 10/2004 | Madsen |  |
|---|---|---|---|---|---|
| 7,003,228 | B2 | * | 2/2006 | Wang et al. | 398/85 |
| 7,386,240 | B2 | * | 6/2008 | Thomson et al. | 398/193 |
| 7,444,085 | B2 | * | 10/2008 | Ikeuchi et al. | 398/202 |
| 7,689,133 | B2 | * | 3/2010 | Katagiri et al. | 398/204 |
| 7,734,196 | B2 | * | 6/2010 | Takahara | 398/208 |
| 2004/0081470 | A1 |  | 4/2004 | Griffin |  |
| 2005/0226631 | A1 |  | 10/2005 | Thomson et al. |  |
| 2006/0285854 | A1 | * | 12/2006 | Sun et al. | 398/155 |
| 2007/0047964 | A1 | * | 3/2007 | Ooi et al. | 398/147 |
| 2009/0060511 | A1 | * | 3/2009 | Toyoshima et al. | 398/74 |
| 2009/0142075 | A1 | * | 6/2009 | Akiyama et al. | 398/202 |
| 2009/0226165 | A1 | * | 9/2009 | Tanaka et al. | 398/25 |
| 2010/0329697 | A1 | * | 12/2010 | Koizumi et al. | 398/208 |

FOREIGN PATENT DOCUMENTS

| JP | 2001-014804 | 1/2001 |
|---|---|---|
| JP | 2004-516743 | 6/2004 |
| JP | 2007-020138 | 1/2007 |
| JP | 2007-96374 | 4/2007 |
| WO | WO 02/51041 | 6/2002 |

OTHER PUBLICATIONS

"43 Gbit/s SiGe Based Electronic Equalizer for PMD and Chromatic Dispersion Mitigation" by B. Franz et al. We1.3.1. ECOC 2005.
"Electrical PMD equalizer ICs for a 40-Gbit/s transmission" by M. Nakamura et al. TuG4, OFC 2004.
"Electronic Dispersion Compensation" by D. McGhan, OWK 1, OFC 2006.
Japanese Office Action mailed Dec. 27, 2011 issued in corresponding Japanese Patent Application No. 2007-289859.

* cited by examiner

*Primary Examiner* — Leslie Pascal
(74) *Attorney, Agent, or Firm* — Staas & Halsey LLP (57) ABSTRACT

An optical receiving apparatus branches an optical signal, photo-electric-converts the branched signals, and compensates dispersion in each of the converted electrical signals. Electrical-dispersion compensators respectively compensate the dispersion in the electrical signals using a transversal filter having plural taps. A dispersion control unit controls the dispersion compensation amount for each of the electrical signals by adjusting tap coefficients of the transversal filter. A delay control unit controls the difference in the delay time of the electrical signals by adjusting the tap coefficients adjusted by the dispersion control unit. An identifying circuit identifies data in the optical signal based on each of the electrical signals that have been subjected to dispersion compensation by each of the electrical-dispersion compensators.

15 Claims, 10 Drawing Sheets

| | TAP COEFFICIENTS OF ELECTRICAL-DISPERSION COMPENSATOR 151 | | | | TAP COEFFICIENTS OF ELECTRICAL-DISPERSION COMPENSATOR 152 | | | |
|---|---|---|---|---|---|---|---|---|
| | c1 | c2 | c3 | c4 | c1 | c2 | c3 | c4 |
| 301 | -0.3 | 1 | 1 | -0.4 | -0.2 | 1 | 1 | -0.4 |
| 302 | -0.25 | 1 | 1 | -0.4 | -0.3 | 1 | 1 | -0.4 |
| ⋮ | ⋮ | ⋮ | ⋮ | ⋮ | ⋮ | ⋮ | ⋮ | ⋮ |

| CONDITION | TAP COEFFICIENTS OF ELECTRIC DISPERSION COMPENSATOR 151 | | | | TAP COEFFICIENTS OF ELECTRIC DISPERSION COMPENSATOR 152 | | | |
|---|---|---|---|---|---|---|---|---|
| TEMPERATURE | c1 | c2 | c3 | c4 | c1 | c2 | c3 | c4 |
| 60°C | -0.3 | 1 | 1 | -0.4 | -0.2 | 1 | 1 | -0.4 |
| 80°C | -0.25 | 1 | 1 | -0.4 | -0.3 | 1 | 1 | -0.4 |
| ⋮ | ⋮ | ⋮ | ⋮ | ⋮ | ⋮ | ⋮ | ⋮ | ⋮ |

ELECTRICAL-DISPERSION COMPENSATING APPARATUS, OPTICAL RECEIVING APPARATUS, AND OPTICAL RECEIVING METHOD

CROSS-REFERENCE TO RELATED APPLICATIONS

This application is based upon and claims the benefit of priority from the prior Japanese Patent Application No. 2007-289859, filed on Nov. 7, 2007, the entire contents of which are incorporated herein by reference.

BACKGROUND OF THE INVENTION

1. Field of the Invention

The present invention relates to dispersion compensation using an electrical-dispersion compensating circuit.

2. Description of the Related Art

Recently, demand has increased for the introduction of next-generation 40-Gb/s optical transmission systems having an equivalent transmission distance and frequency utilization efficiency as 10-Gb/s systems. Therefore, research and development of a differential phase shift keying (DPSK) scheme that is excellent in its optical signal noise ratio (OSNR) resistance and non-linearity resistance is actively being conducted to realize the above.

In addition to the above modulating scheme, research and development of a differential quadrature phase shift keying (DQPSK) scheme having a feature of narrow spectrum (high frequency utilization efficiency) is also actively being conducted. The DQPSK scheme is a scheme of simultaneously transmitting two digital signals that are phase-shift keyed, using a signal light beam having one frequency.

The DQPSK scheme needs only a half of the generally used pulse repetition frequency (for example, 20 GHz) against a data rate for transmission (for example, 40 Gb/s). Therefore, compared to a conventional NRZ keying scheme, etc., the signal spectrum width of the DQPSK scheme is halved and this scheme is excellent in terms of its frequency utilization efficiency, frequency dispersion resistance, device transmission properties, etc. Therefore, in the field of optical transmission systems, application of the DQPSK scheme is commonly considered especially for high-speed transmission systems having data rates exceeding 40 Gb/s.

A typical optical receiver realizing the DQPSK scheme, such as that disclosed in Japanese Patent Application Laid-Open Publication Nos. 2004-516743 and 2007-20138, includes a pair of Mach-Zehnder interferometers that correspond to an "A" branch and a "B" branch. Two output terminals of each Mach-Zehnder interferometer are connected to a balanced photo diode (PD) to recover transmitted data.

On the other hand, concerning ultra-high-speed optical transmission systems, the realization of a system is hindered by degradation of the wave form caused by wavelength dispersion and wave polarization mode dispersion in optical components such as optical fibers and optical amplifiers. Therefore, a technique is used to compensate the degradation of the wave form caused by the wavelength dispersion and the wave polarization mode dispersion. Conventionally, dispersion compensation is executed using mainly optical components such as that disclosed in U.S. Pat. No. 6,807,321.

Meanwhile, recently, an electrical-dispersion compensation (EDC) device using an electric circuit is drawing attention from the perspective of the need to reduce apparatus size and cost concerning optical transmission systems (see, e.g., the Japanese Patent Application Laid-Open Publication Nos. 2004-516743 and 2007-20138, and U.S. Pat. No. 6,807,321 above). The electrical-dispersion compensation device is configured by a transversal filter having plural taps. The level of compensation by the device is varied by adjusting tap coefficients, thereby compensating the degradation of the wave form caused by the wavelength dispersion and wave polarization mode dispersion.

To adjust the tap coefficients, for example, algorithms are used that incrementally correct the tap coefficients such that an equalized error signal becomes minimal using training data, which is known data and user data, which is unknown data, such as a minimum square error (MSE) method, a zero forcing (ZF) method, or a modified zero forcing (MZF) method (see, e.g., Japanese Patent Application Laid-Open Publication No. 2001-14804).

However, with the above conventional techniques and those covered by, for example, Mc Ghan, D., et al. in "Electrical Dispersion Compensation," OWK1, OFC 2006; Nakamura, M., et al. in "Electrical PMD equalizer ICs for a 40-Gbit/s transmission," TuG4, OFC 2004; and Franz, B., et al. in "43 Gbit/s SiGe Based Electronic Equalizer for PMD and Chromatic Dispersion Mitigation," We1.3.1, ECOC 2005, a problem arises in that differences in delay time occur among electrical signals input into an identifying circuit due to the initial variations among elements provided between an optical branching unit and the identifying circuit of an optical receiving apparatus and variation over time thereof. When differences in delay time occur among the electrical signals, the margin for phase synchronization among the electrical signals becomes small with respect to the identifying circuit and the identification of each optical signal becomes difficult. Therefore, a problem arises in that the receiving property is degraded. The phase margin decreases as the speed of an optical signal increases and, therefore, the degradation of the receiving property due to the differences in delay time among the electrical signals becomes prominent.

When differences in delay time among the electrical signals become large, the sign order of the electrical signals become inversed in the identifying circuit and optical signal identification becomes impossible. The occurrence of differences in delay time among the electrical signals may be suppressed by elaborating the skew specification of each of the elements provided between the branching unit and the identifying circuit for an optical signal. However, in addition to an increased cost of the apparatus, a problem arises in that differences in delay time among the electrical signals due to the variation over time of the elements can not be coped with.

Differences in delay time among the electrical signals may be compensated by providing a variable phase shifter that supplies a variable delay amount to the electrical signals on one path of each of the electrical signals. However, when the variable phase shifter is provided, a problem arises in that the apparatus becomes large and the cost of the apparatus increases. A variable phase shifter usually imparts, to an electrical signal, a delay that corresponds to a given electric current value or a given voltage value. However, a problem arises in that it is difficult to precisely compensate the differences in delay time among the electrical signals by universal control of the current value or the voltage value.

SUMMARY OF THE INVENTION

It is an object of the present invention to at least solve the above problems in the conventional technologies.

An electrical-dispersion compensating apparatus according to one aspect of the present invention respectively compensates dispersion of electrical signals obtained by branching an optical signal into branched signals and photo-electric-converting the branched signals. The electrical-dispersion compensating apparatus includes a dispersion compensating unit that compensates dispersion of each of the electrical signals using a filter having a plurality of taps; a dispersion control unit that controls a dispersion compensation amount for each of the electrical signals by adjusting tap coefficients of the dispersion compensating unit; and a delay control unit that controls a difference in delay time of the electrical signals by adjusting the tap coefficients adjusted by the dispersion control unit.

An optical receiving apparatus according to another aspect of the present invention includes an electrical-dispersion compensating apparatus that respectively compensates dispersion of electrical signals obtained by branching an optical signal into branched signals and photo-electric-converting the branched signals and includes a dispersion compensating unit that compensates dispersion of each of the electrical signals using a filter having a plurality of taps, a dispersion control unit that controls a dispersion compensation amount for each of the electrical signals by adjusting tap coefficients of the dispersion compensating unit, and a delay control unit that controls a difference in delay time of the electrical signals by adjusting the tap coefficients adjusted by the dispersion control unit. The optical receiving apparatus further includes an identifying unit that identifies data of the optical signal based on the electrical signals that have been subjected to dispersion compensation by the dispersion compensating unit.

An optical receiving method according to still another aspect of the present invention involves respectively compensating dispersion in electrical signals obtained by branching an optical signal into branched signals and photo-electric converting the branched signals. The optical receiving method includes compensating dispersion of each of the electrical signals using a filter having a plurality of taps; controlling a dispersion compensation amount for each of the electrical signals by adjusting tap coefficients at the compensating of the dispersion; controlling a difference in delay time of the electrical signals by adjusting the tap coefficients adjusted at the controlling of the dispersion compensation amount; and identifying data of the optical signal based on each of the electrical signals that have been subjected to dispersion compensation at the compensating of the dispersion.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
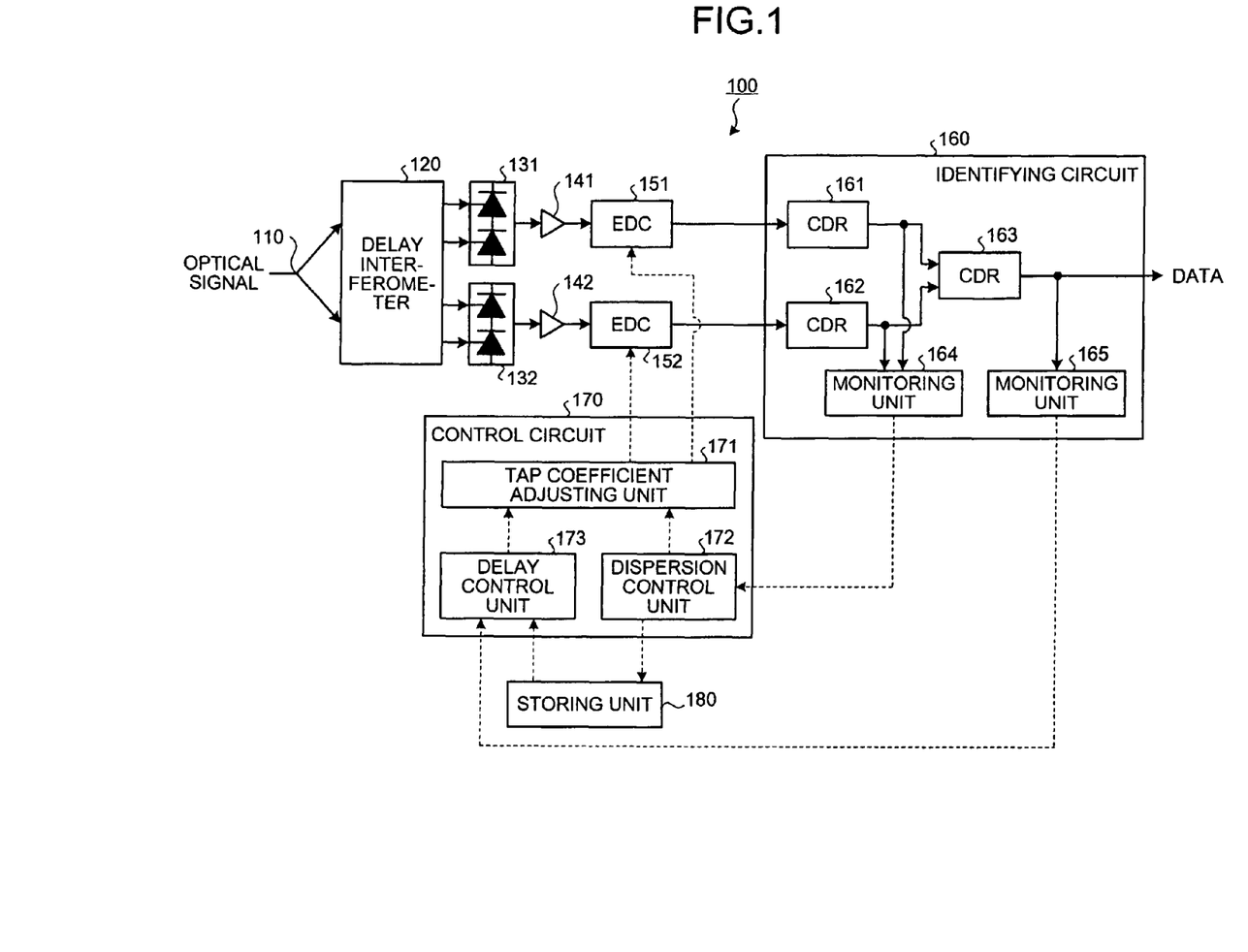
FIG. 1 is a block diagram of a functional configuration of an optical receiving apparatus according to a first embodiment.

FIG. 1 is a block diagram of the functional configuration of an optical receiving apparatus according to the first embodiment. The optical receiving apparatus according to the first embodiment receives an optical signal transmitted in the DQPSK scheme. In FIG. 1, solid lined arrows indicate the flow of a data signal and dotted lined arrows indicate the flow of a control signal. The optical receiving apparatus 100 according to the first embodiment includes an optical branching unit 110, a delay interferometer 120, photo-electric converting units 131 and 132, amplifiers 141 and 142, electrical-dispersion compensators 151 and 152, an identifying circuit 160, a control circuit 170, and a storing unit 180.

The optical branching unit 110 branches an optical signal input from an external source and outputs the branched optical signals to the delay interferometer 120. The delay interferometer 120 extracts an I-phase signal of the optical signals output from the optical branching unit 110 and outputs the extracted signal to the photo-electric converting unit 131. The delay interferometer 120 also extracts a Q-phase signal of the optical signals output from the optical branching unit 110 and outputs the extracted signal to the photo-electric converting unit 132. The I-phase signal and the Q-phase signal are respectively binary-intensity optical signals.

More specifically, the delay interferometer 120 includes a pair of Mach-Zehnder interferometers respectively corresponding to the I-phase and the Q-phase of an optical signal. Each of the Mach-Zehnder interferometers includes an optical delay element that corresponds to a symbol period in a transmission system. The optical phase difference between arms of each Mach-Zehnder interferometer is set at $\pi/4$ for one of the Mach-Zehnder interferometers and $-\pi/4$ for the other Mach-Zehnder interferometer. For example, the Japanese Patent Application Laid-Open Publication Nos. 2004-516743 and 2007-20138, and U.S. Pat. No. 6,807,321 above can be referred to for the details of the configuration of a Mach-Zehnder interferometer.

The photo-electric converting unit 131 converts the I-phase signal output from the delay interferometer 120 into an electrical intensity signal and outputs this electrical intensity signal to the amplifier 141. The photo-electric converting unit 132 converts the Q-phase signal output from the delay interferometer 120 into an electrical intensity signal and outputs this electrical intensity signal to the amplifier 142. In the description given below, an electrical intensity signal is simply referred to as an "electrical signal". Each of the photo-electric converting units 131 and 132 is, for example, a balanced PD.

The amplifier 141 amplifies the electrical signal output from the photo-electric converting unit 131 and outputs this signal to the electrical-dispersion compensator 151. The amplifier 142 amplifies the electrical signal output from the photo-electric converting unit 132 and outputs this signal to the electrical-dispersion compensator 152. The electrical-dispersion compensator (EDC) 151 compensates the dispersion of the electrical signal output from the amplifier 141 and outputs this signal to the identifying circuit 160. The electrical-dispersion compensator 152 compensates the dispersion of the electrical signal output from the amplifier 142 and outputs this signal to the identifying circuit 160.

Each of the electrical-dispersion compensators 151 and 152 is configured by a transversal filter that has plural taps. The amount of dispersion compensation provided to the electrical signals respectively by the electrical-dispersion compensators 151 and 152 is varied by respectively adjusting the tap coefficients of the transversal filters. A tap coefficient is a weighting coefficient for a component of an electrical signal that passes through a tap of a transversal filter.

The identifying circuit 160 is an identifying unit that, based on the electrical signals output respectively from the electrical-dispersion compensators 151 and 152, identifies data carried by the optical signal input into the optical branching unit 110. More specifically, the identifying circuit 160 includes recovering units 161, 162, and 163, and monitoring units 164 and 165. Each of the recovering units 161, 162, and 163 is a clock and data recovery (CDR) circuit that recovers the data and a clock signal of an electrical signal.

The recovering units 161 and 162 are first recovering units that recover the data respectively of the electrical signals output respectively from the electrical-dispersion compensators 151 and 152. The recovering unit 161 recovers the data of the electrical signal output from the electrical-dispersion compensator 151 and outputs this data to the recovering unit 163. The recovering unit 162 recovers the data of the electrical signal output from the electrical-dispersion compensator 152 and outputs this data to the recovering unit 163.

Each of the electrical signals output from the recovering units 161 and 162 to the recovering units 163 is binary data. The recovering unit 163 is a second recovering unit that, based on the electrical signals output respectively from the recovering units 161 and 162, recovers data. More specifically, the recovering unit 163 synchronizes the electrical signals output respectively from the recovering units 161 and 162 and identifies four-digit data using a combination of the electrical signals.

The recovering unit 163 outputs the electrical signal indicative of the four-digit data to an external destination. The monitoring unit 164 branches at least the electrical signal output from the recovering unit 161 to the recovering unit 163 or the electrical signal output from the recovering unit 162 to the recovering unit 163, obtains the branched signal, calculates the bit error rate (BER) of the obtained electrical signal, and outputs the BER to the control circuit 170.

The monitoring unit 165 branches the electrical signal output from the recovering unit 163, obtains the branched electrical signal, calculates the BER of the obtained electrical signal, and outputs the BER to the control circuit 170. For the calculation of the BER in the monitoring units 164 and 165, for example, forward error correction (FEC), etc., can be employed.

The control circuit 170 includes a tap coefficient adjusting unit 171, a dispersion control unit 172, and a delay control unit 173. The control circuit 170 is configured by, for example, a central processing unit (CPU). The tap coefficient adjusting unit 171 adjusts the tap coefficients of the electrical-dispersion compensators 151 and 152 under the control of the dispersion control unit 172 or the delay control unit 173.

The dispersion control unit 172 controls the amount of dispersion compensation to each of the electrical signals by adjusting the tap coefficients for each of the electrical-dispersion compensators 151 and 152. The dispersion control unit 172 adjusts the tap coefficients through the tap coefficient adjusting unit 171. For example, the dispersion control unit 172 adjusts the tap coefficients of the electrical-dispersion compensators 151 and 152 based on the BER output from the monitoring unit 164.

The dispersion control unit 172 may also adjust the tap coefficients of the electrical-dispersion compensators 151 and 152 to predetermined coefficients based on the properties of the transversal filters. The predetermined coefficients may be fixed coefficients or may be coefficients that respectively correspond to desired dispersion compensation amounts.

A threshold value concerning the BER of each electrical signal output from each of the recovering units 161 and 162 to the recovering unit 163 will be referred to as a "first threshold value". The dispersion control unit 172 adjusts the tap coefficients such that the BER output from the monitoring unit 164 becomes equal to or less than the first threshold value. The dispersion control unit 172 may adjust the tap coefficients such that the BER output from the monitoring unit 164 becomes minimal. The dispersion control unit 172 causes the storing unit 180 to store information concerning the adjusted tap coefficients.

When the electrical-dispersion compensators 151 and 152 are configured respectively by transversal filters having identical properties, the dispersion control unit 172 sets the same tap coefficients for each of the transversal filters. When the electrical-dispersion compensators 151 and 152 are configured respectively by transversal filters each having different properties, the dispersion control unit 172 individually adjusts the tap coefficients of each of the transversal filters.

When the tap coefficients of each of the transversal filters are individually adjusted, the dispersion control unit 172 obtains, from the monitoring unit 164, the BER of the electrical signal output from the recovering unit 161 and adjusts the tap coefficients of the electrical-dispersion compensator 151 based on the obtained BER. The dispersion control unit 172 obtains, from the monitoring unit 164, the BER of the electrical signal output from the recovering unit 162 and adjusts the tap coefficients of the electrical-dispersion compensator 152 based on the obtained BER.

The dispersion control unit 172 may generate a list of the tap coefficients with which the BER output from the monitoring unit 164 becomes equal to or less than the first threshold value. The dispersion control unit 172 adjusts the tap coefficients such that the BER output from the monitoring unit 164 becomes equal to or less than the first threshold value and the tap coefficients of the electrical-dispersion compensator 151 are different from those of the electrical-dispersion compensator 152, and the unit 172 adds combinations of the adjusted tap coefficients to the list. The dispersion control unit 172 causes the storing unit 180 to store the list generated.

The delay control unit 173 controls a difference in delay time among the electrical signals by finely adjusting the combination of the tap coefficients of the electrical-dispersion compensators 151 and 152 adjusted by the dispersion control unit 172. More specifically, the delay control unit 173 further finely adjusts the tap coefficients indicated by the information concerning the tap coefficients stored in the storing unit 180 and, thereby, sets these tap coefficients in the electrical-dispersion compensators 151 and 152.

The delay control unit 173 finely adjusts the tap coefficients through the tap coefficient adjusting unit 171. The delay control unit 173 finely adjusts the tap coefficients based on the information that indicates the difference in the delay time of the electrical signals input to the recovering unit 163, information concerning, for example, the difference in the delay time of the electrical signals output from each of the electrical-dispersion compensators 151 and 152 or the difference in the delay time of the electrical signals output from each of the recovering units 161 and 162.

The difference in the delay time of the electrical signals input into the recovering unit 163 is reflected on the BER of the electrical signal (data) recovered by the recovering unit 163. Therefore, the information (indicator) indicating the difference in the delay time of the electrical signals may be the BER of the electrical signal recovered by the recovering unit 163. A threshold value concerning the difference in the delay time of the electrical signals input into the recovering unit 163 will be referred to as a "second threshold value".

The delay control unit 173, for example, obtains the BER of the electrical signal recovered by the recovering unit 163 from the monitoring unit 165 and finely adjusts the tap coefficients such that the obtained BER becomes equal to or less than the second threshold value. In this case, the delay control unit 173, to the extent that the BER of each electrical signal output from the recovering units 161 and 162 to the recovering unit 163 does not exceed the first threshold value, finely adjusts the combination of the tap coefficients of the electrical-dispersion compensators 151 and 152.

More specifically, when the delay control unit 173 finely adjusts the tap coefficients such that the BER obtained from the monitoring unit 165 becomes equal to or less than the second threshold value, the unit 173 may obtain the information concerning the BER output from the monitoring unit 164 (not indicated by an arrow) and may adjust the BER obtained from the monitoring unit 164 such that the BER does not exceed the first threshold value. When the dispersion control unit 172 generates the list of the tap coefficients, the delay control unit 173 sets tap coefficients, selected from among the tap coefficients included in the list generated by the dispersion control unit 172, such that the BER obtained from the monitoring unit 165 becomes equal to or less than the second threshold value.

Figure 2:
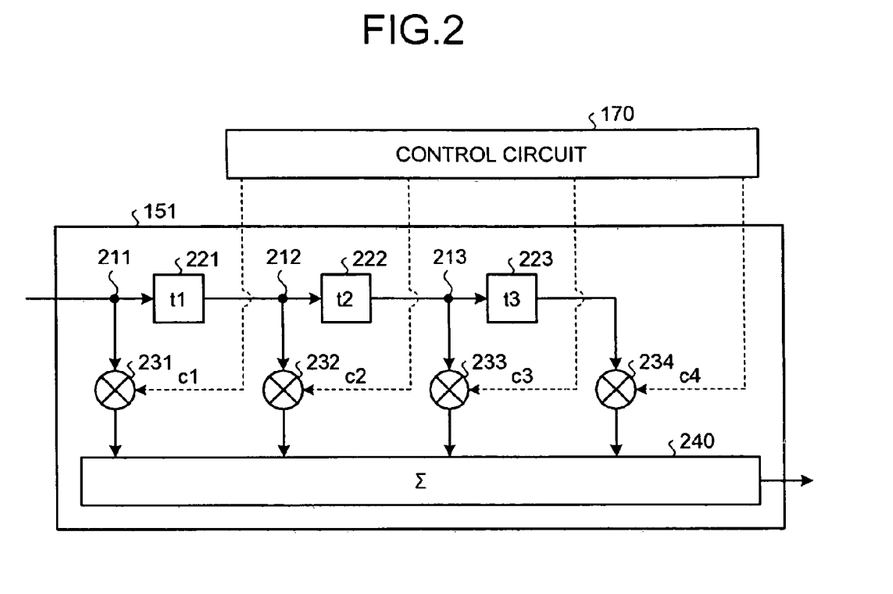
FIG. 2 is a circuit diagram of an exemplary configuration of an electrical-dispersion compensator.

FIG. 2 is a circuit diagram of an exemplary configuration of the electrical-dispersion compensator. As shown in FIG. 2, the electrical-dispersion compensator 151 includes branching units 211 to 213, delaying units 221 to 223, multiplying units 231 to 234, and an adding unit 240. The control circuit 170 outputs weighting coefficients c1 to c4 (the tap coefficients) respectively to the multiplying units 231 to 234.

The branching unit 211 branches the electrical signal output from the amplifier 141 and outputs the branched electrical signals respectively to the delaying unit 221 and the multiplying unit 231. The delaying unit 221 delays the electrical signal output from the branching unit 211 by a time period t1 and outputs this signal to the branching unit 212. The multiplying unit 231 multiplies the electrical signal output from the branching unit 211 with the weighting coefficient c1 output from the control circuit 170 and outputs the obtained product to the adding unit 240.

The branching unit 212 branches the electrical signal output from the delaying unit 221 and outputs the branched electrical signals respectively to the delaying unit 222 and the multiplying unit 232. The delaying unit 222 delays the electrical signal output from the branching unit 212 by a time period t2 and outputs this signal to the branching unit 213. The multiplying unit 232 multiplies the electrical signal output from the branching unit 212 with the weighting coefficient c2 output from the control circuit 170 and outputs the obtained product to the adding unit 240.

The branching unit 213 branches the electrical signal output from the delaying unit 222 and outputs the branched electrical signals respectively to the delaying unit 223 and the multiplying unit 233. The delaying unit 223 delays the electrical signal output from the branching unit 213 by a time period t3 and outputs the signal to the multiplying unit 234. The multiplying unit 233 multiplies the electrical signal output from the branching unit 213 with the weighting coefficient c3 output from the control circuit 170 and outputs the obtained product to the adding unit 240.

The multiplying unit 234 multiplies the electrical signal output from the delaying unit 223 with the weighting coefficient c4 output from the control circuit 170 and outputs the product to the adding unit 240. The adding unit 240 adds the electrical signals output respectively from the multiplying units 231 to 234 and outputs the obtained sum to the identifying circuit 160. In this manner, the four taps connected in parallel are formed by the branching units 211 to 213 and the adding unit 240. The configuration of the electrical-dispersion compensator 152 is identical to that of the electrical-dispersion compensator 151.

Due to this configuration of the electrical-dispersion compensator 151, the components of the electrical signal respectively having different delay amounts are output respectively to the multiplying units 231 to 234, are weighted based respectively on the weighting coefficients c1 to c4, and are added together by the adding unit 240. Hence, the electrical signal input to the electrical-dispersion compensator 151 is dispersion compensated by respectively compensating delay components of the electrical signal.

By varying the weighting coefficients c1 to c4, the delay amount of an electrical signal that passes through the electrical-dispersion compensator 151 can be varied. For example, by setting the weighting coefficients c3 and c4 for the components having a large delay amount to be larger than the weighting coefficients c1 and c2 for the components having a small delay amount, the components that have a large delay amount are output being emphasized and the delay amount of the electrical signal that has passed through the electrical-dispersion compensator 151 becomes large.

In contrast, by setting the weighting coefficients c1 and c2 for the components having a small delay amount to be larger than the weighting coefficients c3 and c4 for the components having a large delay amount, the components of the electrical signal that have a small delay amount are output being emphasized and the delay amount of the electrical signal that passes through the electrical-dispersion compensator 151 becomes small. The weighting coefficients respectively of the taps provided at the ends of the sequence of the taps have a large effect on the delay amount of the electrical signal.

Especially, by varying the tap coefficients (c1 and c4) respectively at the ends of the sequence of the taps, the delay amount of an electrical signal that has passed the electrical-dispersion compensator 151 can be significantly varied. For example, by varying only the coefficients (c1 and c4) respectively at the ends of the sequence of the taps, the delay amount of the electrical signal can be significantly varied simplifying the adjustment of the tap coefficients. Therefore, the compensation of the difference in the delay time of the electrical signals by the delaying control unit 173 can be efficiently executed.

Figure 3:
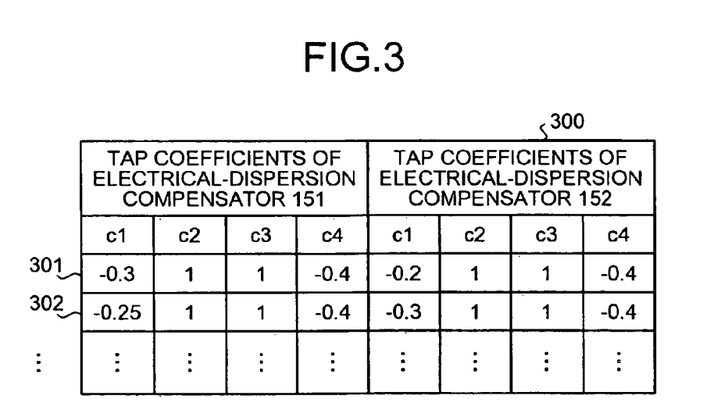
FIG. 3 is a chart of an example of a list stored in a storing unit.

FIG. 3 is a chart of an example of the list stored in the storing unit. As shown in FIG. 3, a list 300 generated by the dispersion control unit 172 and stored in the storing unit 180 includes combinations of the tap coefficients of the electrical-dispersion compensators 151 and 152. Each of the combinations 301, 302, etc., is a combination of the tap coefficients with which the BER output from the monitoring unit 164 becomes equal to or less than the first threshold value. The relationship between the tap coefficients of the electrical-dispersion compensator 151 and the tap coefficients of the electrical-dispersion compensator 152 is different for each of the combinations 301, 302, etc.

Therefore, adjustment the tap coefficients of the electrical-dispersion compensators 151 and 152 through the selection of any one of the combinations 301, 302, etc., enables different delay amounts to be provided respectively to the electrical signals that pass the electrical-dispersion compensators 151 and 152. By changing the combination selected from the combinations 301, 302, etc., the relative delay amount of each electrical signal can be controlled.

Figure 4:
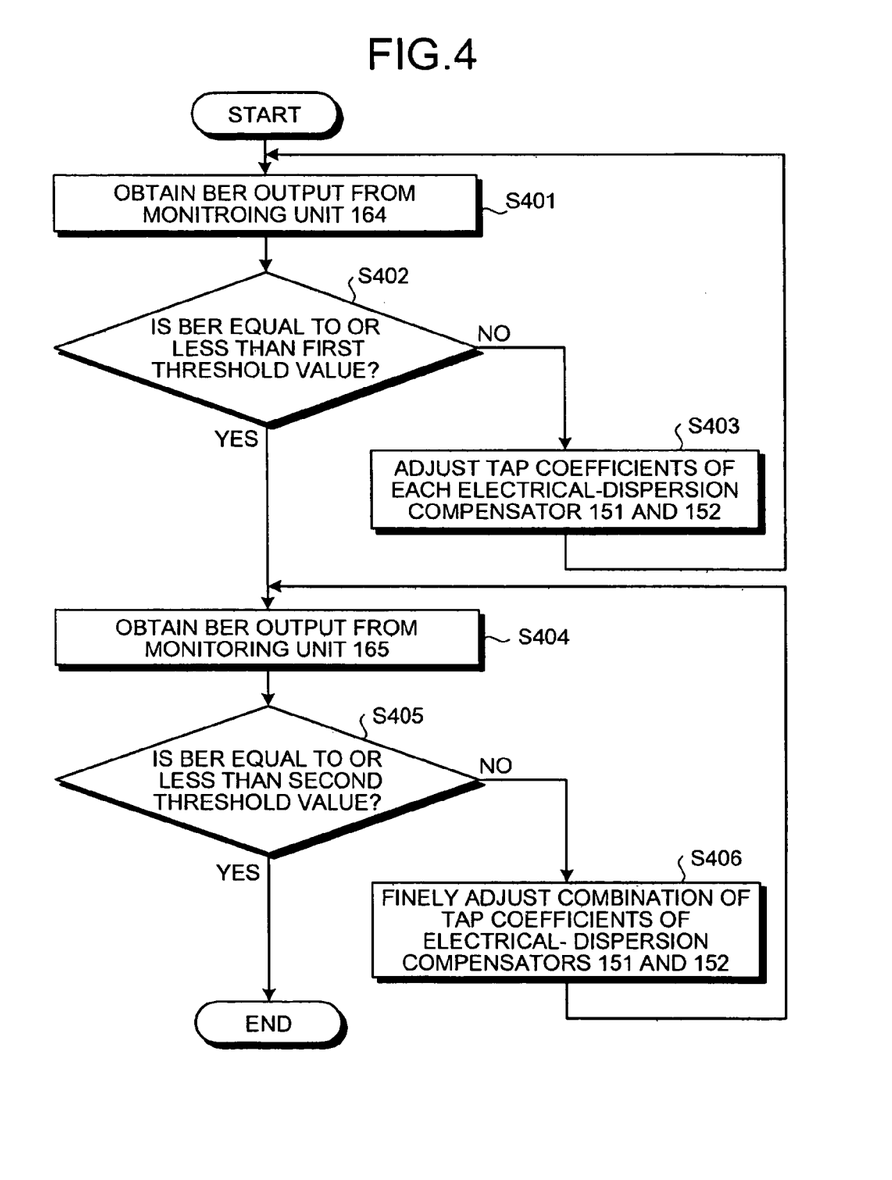
FIG. 4 is a flowchart of an example of the operation of a control circuit.

FIG. 4 is a flowchart of an example of the operation of the control circuit. With reference to FIG. 4, description is given for an operation executed when the dispersion control unit 172 generates the list 300 of the tap coefficients. The dispersion control unit 172 obtains the BER output from the monitoring unit 164 (step S401). The dispersion control unit 172 determines whether the BER obtained at step S401 is equal to or less than the first threshold value (step S402).

When the BER is not equal to or less than the first threshold value at step S402 (step S402: NO), the tap coefficients of the electrical-dispersion compensators 151 and 152 are respectively adjusted (step S403). The procedure returns to step S401 and the processing is continued. When the BER is equal to or less than the first threshold value at step S402 (step S402: YES), the delay control unit 173 obtains the BER output from the monitoring unit 165 (step S404).

The delay control unit 173 then determines whether the BER obtained at step S404 is equal to or less than the second threshold value (step S405). When the BER is not equal to or less than the second threshold value (step S405: NO), the combination of tap coefficients of the electrical-dispersion compensators 151 and 152 is finely adjusted (step S406). The procedure returns to step S404 and the processing is continued.

When the BER is equal to or less than the second threshold value at step S405 (step S405: YES), the series of operations of the control circuit 170 comes to an end. The above steps are executed, for example, using the training data before operation of the optical receiving apparatus 100. The above steps may be executed periodically during the operation of the optical receiving apparatus 100.

Steps S401 to S403 concern the control of the dispersion compensation amount for each electrical signal. Steps S404 to S406 concern the control of the difference in the delay time of the electrical signals. When the dispersion compensation amount is fixed and the difference in the delay time of the electrical signals is controlled corresponding to variations over time during operation, etc., steps S401 to S403 may be executed before operating the optical receiving apparatus 100 and steps S404 to S406 may be executed periodically during the operation of the optical receiving apparatus 100.

In the description above, the BER output from the monitoring unit 165 is obtained at step S404 and comparison between the BER and the second threshold value is executed at step S405. However, the information concerning the delay amount of each electrical signal may be obtained at step S404 and the comparison between the information concerning the delay amount of each electrical signal and the second threshold value may be executed at step S405.

Figure 5:
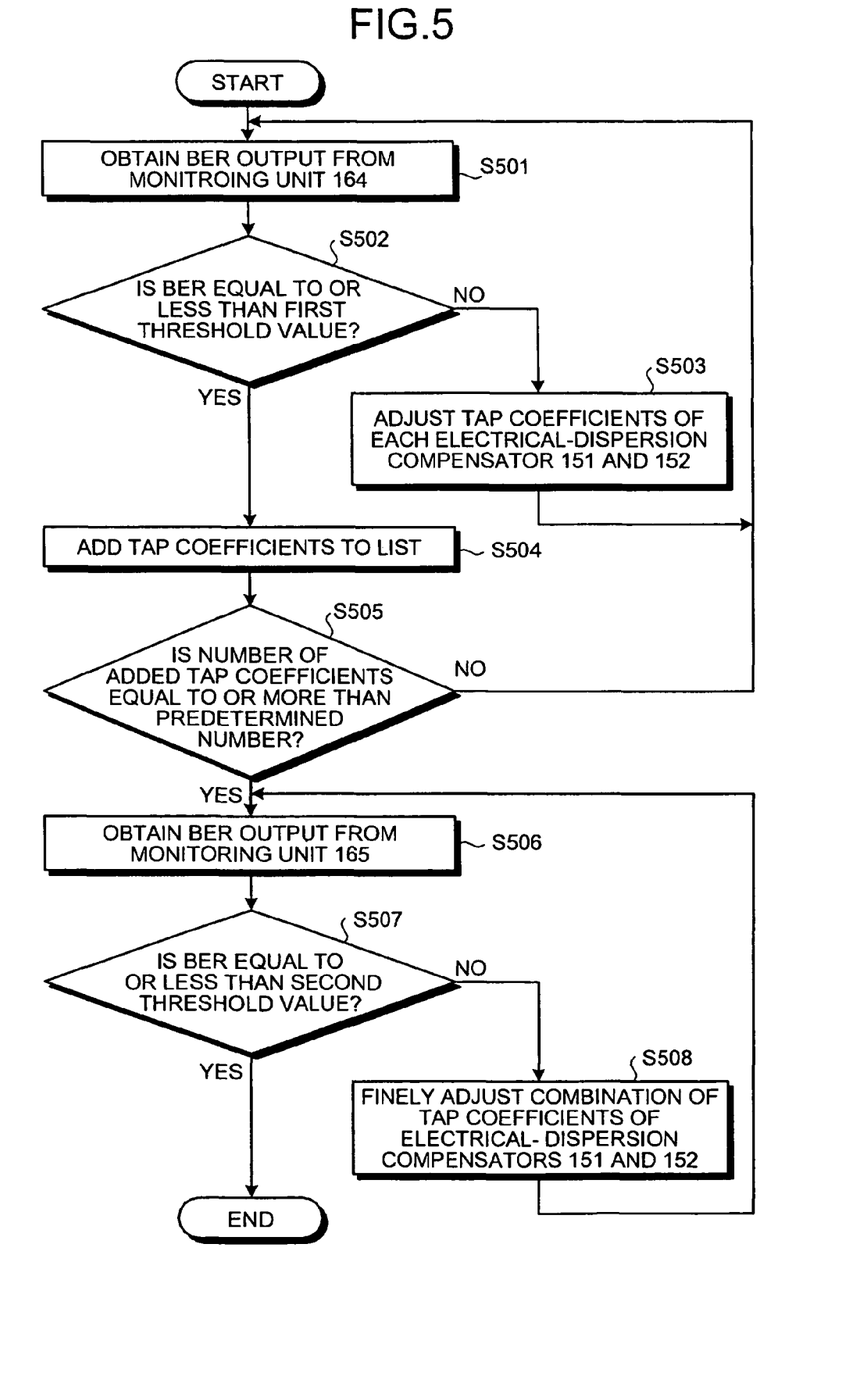
FIG. 5 is a flowchart of another example of the operation of the control circuit.

FIG. 5 is a flowchart of another example of the operation of the control circuit. With reference to FIG. 5, description is given for an operation executed when the dispersion control unit 172 generates the list 300 of the tap coefficients. The dispersion control unit 172 obtains the BER output from the monitoring unit 164 (step S501). The dispersion control unit 172 determines whether the BER obtained at step S501 is equal to or less than the first threshold value (step S502).

When the BER is not equal to or less than the first threshold value at step S502 (step S502: NO), the tap coefficients of the electrical-dispersion compensators 151 and 152 are respectively adjusted (step S503). The procedure returns to step S501 and the processing is continued. When the BER is equal to or less than the first threshold value at step S502 (step S502: YES), the dispersion control unit 172 adds, to the list 300, the tap coefficients of the electrical-dispersion compensators 151 and 152 at this time (step S504).

It is determined whether the number of the tap coefficients added to the list 300 at step S504 is a predetermined number or more (step S505). When the number of the tap coefficients is not a predetermined number or more (step S505: NO), the procedure returns to step S501 and the processing is continued. When the number of the tap coefficients is a predetermined number or more (step S505: YES), the delay control unit 173 obtains the BER output from the monitoring unit 165 (step S506).

The delay control unit 173 determines whether the BER obtained at step S506 is equal to or less than the second threshold value (step S507). When the BER is not equal to or less than the second threshold value (step S507: NO), the combination of the tap coefficients of the electrical-dispersion compensators 151 and 152 is finely adjusted based on the tap coefficients added to the list 300 at step S504 (step S508). The procedure returns to step S506 and the processing is continued.

When the BER is equal to or less than the second threshold value at step S507 (step S507: YES), the series of operations of the control circuit 170 comes to an end. The above steps are executed, for example, using the training data before operation of the optical receiving apparatus 100. The above steps may be executed periodically during the operation of the optical receiving apparatus 100.

Steps S501 to S505 concern the control of the dispersion compensation amount for each electrical signal. Steps S506 to S508 concern the control of the difference in the delay time of the electrical signals. When the dispersion compensation amount is fixed and the difference in the delay time of the electrical signals is controlled corresponding to variations over time during operation, etc., steps S501 to S505 may be executed before operating the optical receiving apparatus 100 and steps S506 to S508 may be executed periodically during the operation of the optical receiving apparatus 100.

In the description above, the BER output from the monitoring unit 165 is obtained at step S506 and comparison between the BER and the second threshold value is executed at step S507. However, the information concerning the delay amount of each electrical signal may be obtained at step S506 and the comparison between the information concerning the delay amount of each electrical signal and the second threshold value may be executed at step S507.

Figure 6:
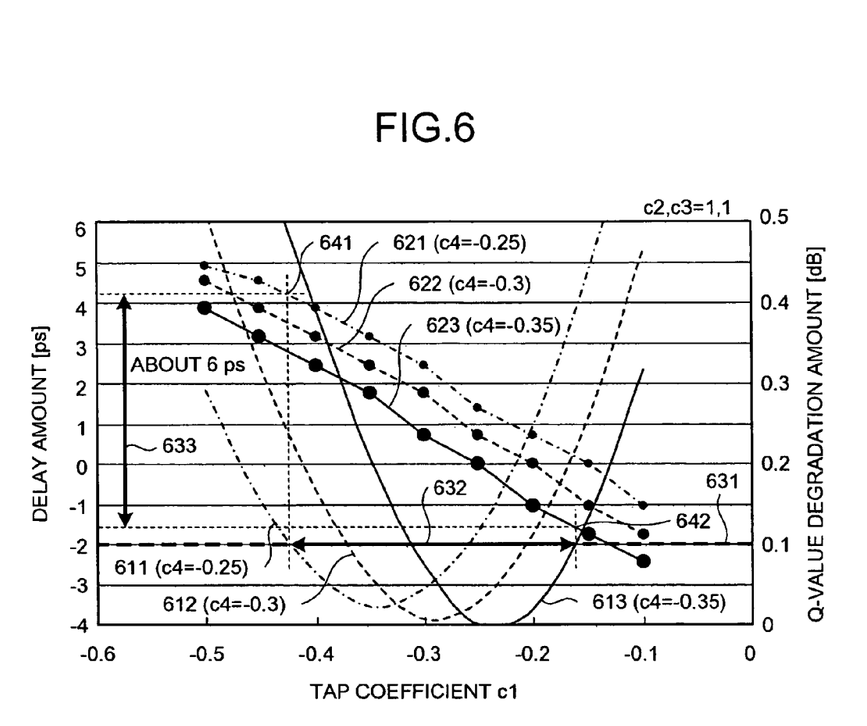
FIG. 6 is a graph of Q-value degradation amounts and delay amounts for the electrical-dispersion compensator with respect to tap coefficients.

FIG. 6 is a graph of Q-value degradation amounts and delay amounts for the electrical-dispersion compensator with respect to tap coefficients. In FIG. 6, the axis represents the coefficient c1 of the electrical-dispersion compensator 151 (see FIG. 2). Curves 611, 612, and 613 respectively represent the amount of Q-value degradation (dB), from the optimal state, in the electrical signal recovered by the recovering unit 161 respectively when the tap coefficient c4 of the electrical-dispersion compensator 151 is −0.25, −0.3, and −0.35.

Curves 621, 622, and 623 respectively represent, as delay time differences (ps) with respect to the optimal state, the delay amounts provided to an electrical signal passing through the electrical-dispersion compensator 151 when the tap coefficient c4 of the electrical-dispersion compensator 151 is −0.25, −0.3, and −0.35, respectively. The tap coefficients c2 and c3 of the electrical-dispersion compensator 151 are each fixed at 1.1.

A threshold value 631 is the value when the amount of Q-value degradation in the electrical signal recovered by the recovering unit 161 is 0.1 dB and the threshold value 631 corresponds to the first threshold value above. As shown by the curves 611, 612, and 613, when the tap coefficient c4 of the electrical-dispersion compensator 151 is varied from −0.25 to −0.35, the range of c1 in which the amount of Q-value degradation is equal to or less than the threshold value 631 is a range 632 (approximately −0.42 to −0.17).

When c1 is varied within the range 632, the delay amount of an electrical signal passing through the electrical-dispersion compensator 151 is varied within a range 633 (approximately −1.5 ps to 4.2 ps). For example, when c1=−0.42 and c4=−0.25 (indicated by reference numeral 641), the delay amount of an electrical signal passing through the electrical-dispersion compensator 151 is approximately 4.2 ps. When c1=−0.17 and c4=−0.35 (indicated by reference numeral 642), the delay amount of an electrical signal passing through the electrical-dispersion compensator 151 is approximately −0.15 ps.

Therefore, within the range (range 632) in which the amount of Q-value degradation in an electrical signal recovered by the recovering unit 161 becomes equal to or less than 0.1 dB (the threshold value 631), the delay amount of the electrical signal passing through the electrical-dispersion compensator 151 can be varied within a range of approximately 6 ps (the range 633). Similarly, for the electrical-dispersion compensator 152, within the range in which the Q-value degradation amount of an electrical signal recovered by the recovering unit 162 becomes equal to or less than 0.1 dB, the delay amount of the electrical signal passing therethrough can be varied within a range of approximately 6 ps.

As a result, the amount of Q-value degradation respectively in the electrical signals compensated for dispersion by the electrical-dispersion compensators 151 and 152 is suppressed to 0.1 dB or less, the combination of the tap coefficients of the electrical-dispersion compensators 151 and 152 is finely adjusted and, thereby, the delay amount of each electrical signal can be varied and the difference in the delay time of the electrical signals can be controlled.

As described above, the optical receiving apparatus 100 according to the first embodiment can control the dispersion compensation amount by adjusting the tap coefficients of the electrical-dispersion compensators 151 and 152, and by further finely adjusting these tap coefficients, can compensate the difference in the delay time of the electrical signals. Hence, the phase margin for synchronizing the electrical signals in the recovering unit 163 becomes large and the receiving property can be improved.

Because the difference in the delay time of the electrical signals can be compensated, the skew specifications can be lowered for the components such as the delay interferometer 120, the photo-electric converting units 131 and 132, the amplifiers 141 and 142, the electrical-dispersion compensators 151 and 152, the identifying circuit 160, and the optical wave guides and conductors connecting these components. Therefore, a reduction in the cost of the apparatus can be facilitated.

The difference in the delay time of the electrical signals is controlled using the existing configuration without providing any variable phase shifter, etc. Therefore, reductions in the size and cost of the apparatus can be facilitated. The delay amount of each electrical signal is controlled using the combinations of the tap coefficients of the transversal filter. Therefore, the delay amount of each electrical signal can be finely varied, thereby enabling the difference in the delay time of the electrical signals to be precisely compensated.

Figure 7:
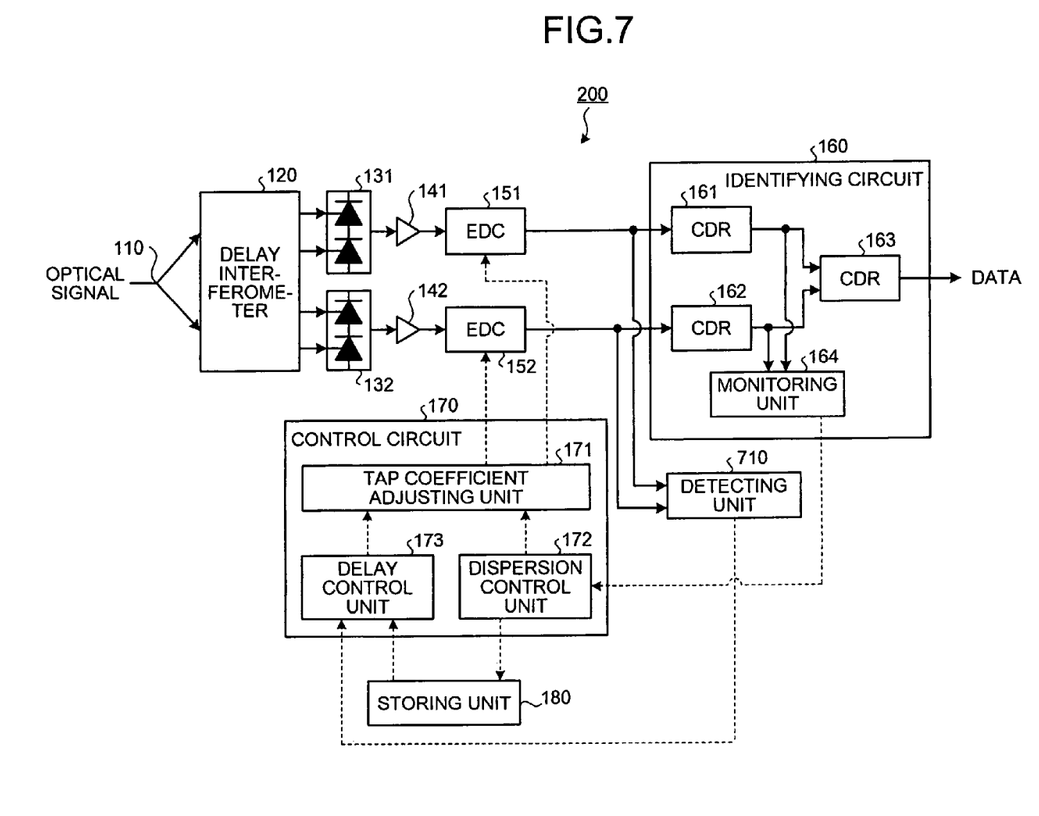
FIG. 7 is a diagram of a functional configuration of an optical receiving apparatus according to a second embodiment.

FIG. 7 is a diagram of a functional configuration of an optical receiving apparatus according to a second embodiment. As shown in FIG. 7, components identical to the components shown in FIG. 1 are given identical reference numerals and the description thereof is omitted. As shown in FIG. 7, an optical receiving apparatus 200 according to the second embodiment includes a detecting unit 710 instead of the monitoring unit 165 of the optical receiving apparatus 100 shown in FIG. 1. The detecting unit 710 is configured by a circuit other than the identifying circuit 160.

The detecting unit 710 branches each of the electrical signals output from the electrical-dispersion compensators 151 and 152 to the identifying circuit 160 and obtains the branched signals. The detecting unit 710 compares each of the obtained signals and detects the difference in the delay time of the electrical signals. The detecting unit 710 is configured by, for example, an adding circuit that compares phases. In this case, the detecting unit 710 compares the phases respectively of the obtained electrical signals and outputs to the control circuit 170 an electrical signal corresponding to the phase difference of electrical signals as information indicating the difference in delay time of the electrical signals.

The delay control unit 173 of the control circuit 170 finely adjusts the tap coefficients based on the electrical signal output from the detecting unit 710. For example, the delay control unit 173 finely adjusts the combination of the tap coefficients of the electrical-dispersion compensators 151 and 152 such that the electrical signal output from the detecting unit 710 becomes equal to or less than the second threshold value. In this case, the second threshold value is a value of a current.

The detecting unit 710 may branch each electrical signal output from the recovering units 161 and 162 to the recovering unit 163 and may obtain the branched signals (not shown by an arrow). In this case, the detecting unit 710 compares the phase of the signals obtained and outputs, to the control circuit 170, an electrical signal corresponding to the phase difference of the electrical signals as information indicating the difference in the delay time of the electrical signals.

As described above, the optical receiving apparatus 200 according to the second embodiment can realize the effect of the optical receiving apparatus 100 and, with the provision of the detecting unit 710 that detects the difference in the delay time of the electrical signals externally from the identifying circuit 160, can facilitate downsizing and simplification of the identifying circuit 160. Hence, the operation of identifying signals by the identifying circuit 160 can be stabilized and the receiving property can be improved.

Figure 8:
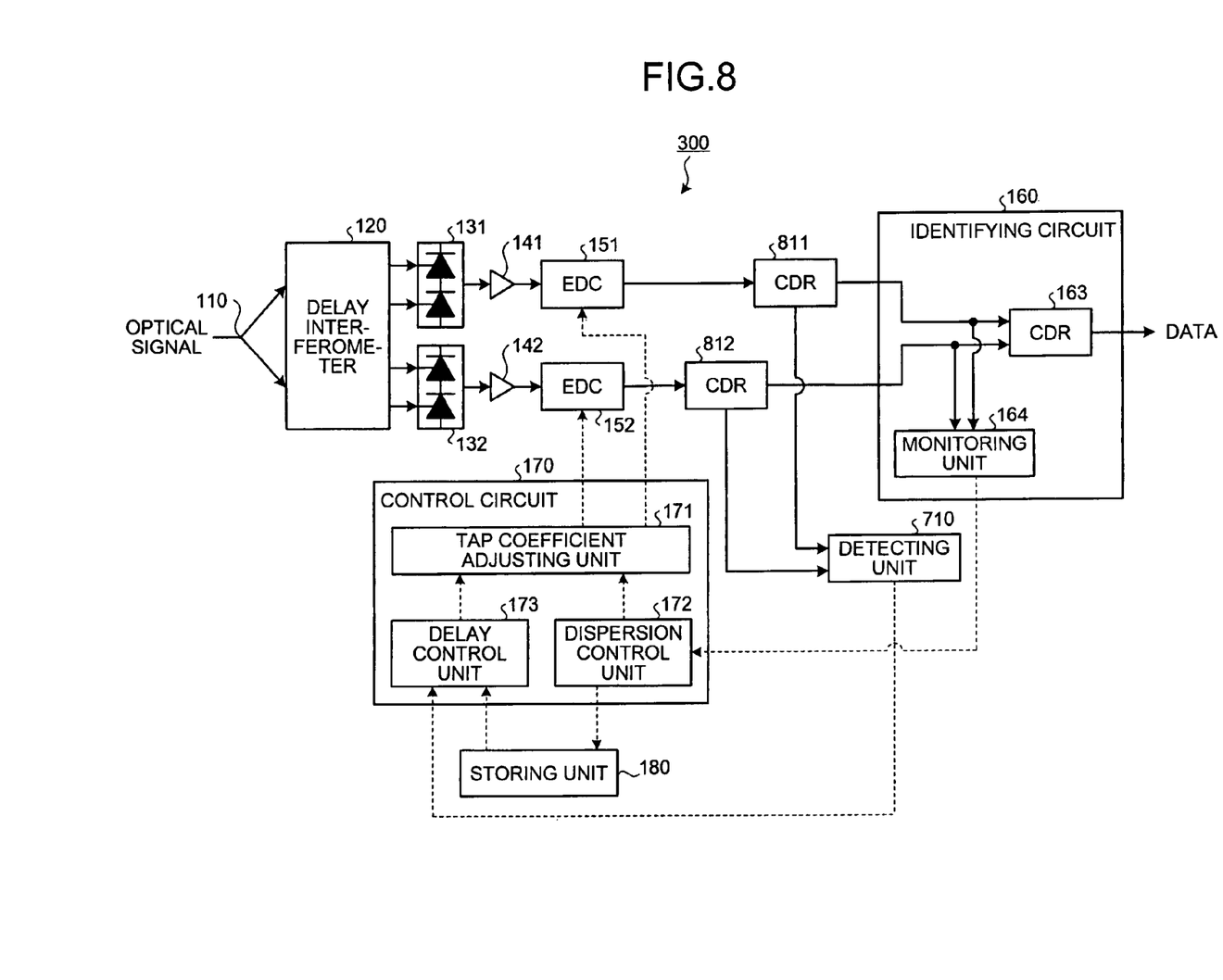
FIG. 8 is a diagram of a functional configuration of an optical receiving apparatus according to a third embodiment.

FIG. 8 is a diagram of a functional configuration of an optical receiving apparatus according to a third embodiment. As shown in FIG. 8, components identical to the components shown in FIG. 7 are given identical reference numerals and the description thereof is omitted. As shown in FIG. 8, an optical receiving apparatus 300 according to the third embodiment includes recovering units 811 and 812 instead of the recovering units 161 and 162 of the optical receiving apparatus 200 shown in FIG. 7.

Each of the recovering units 811 and 812 is configured by a circuit other than the identifying circuit 160. Each of the recovering units 811 and 812 is a CDR circuit that recovers data and a clock signal of an electrical signal. The recovering unit 811 recovers data of the electrical signal output from the electrical-dispersion compensator 151 and outputs the data to the identifying circuit 160. The recovering unit 811 recovers a clock signal of the electrical signal output from the electrical-dispersion compensator 151 and outputs the clock signal to the detecting unit 710.

The recovering unit 812 recovers data of the electrical signal output from the electrical-dispersion compensator 152 and outputs the data to the identifying circuit 160. The recovering unit 812 recovers a clock signal of the electrical signal output from the electrical-dispersion compensator 152 and outputs the clock signal to the detecting unit 710. The recovering unit 163 of the identifying circuit 160 recovers the data based on the electrical signals output respectively from the recovering units 811 and 812.

The detecting unit 710 obtains the clock signals output respectively from the recovering units 811 and 812. The detecting unit 710 compares the phase of each of the obtained clock signals and outputs an electrical signal corresponding to the phase difference of the clock signals to the control circuit 170 as information indicating the difference in the delay time of the electrical signals.

As described above, the optical receiving apparatus 100 according to the third embodiment can realize the effect of the optical receiving apparatus 200 and, with the provision of the recovering units 811 and 812 that respectively recover (externally with respect to the identifying circuit 160) the electrical signals output respectively from the electrical-dispersion compensators 151 and 152, can facilitate further downsizing and increased speed of the identifying circuit 160. Hence, the operation of identifying signals by the identifying circuit 160 can be stabilized and the receiving property can be improved.

The precision of the phase comparison between clock signals is higher compared to the phase comparison between data (see FIG. 7). Therefore, the delay control unit 173 of the control circuit 170 in conjunction with the detecting unit 710 can obtain information that indicates with high precision the difference in the delay time of the electrical signals. Thereby, the precision of the control of the difference in the delay time of the electrical signals by the delay control unit 173 can be improved and the receiving property at the recovering unit 163 can be further improved.

Figure 9:
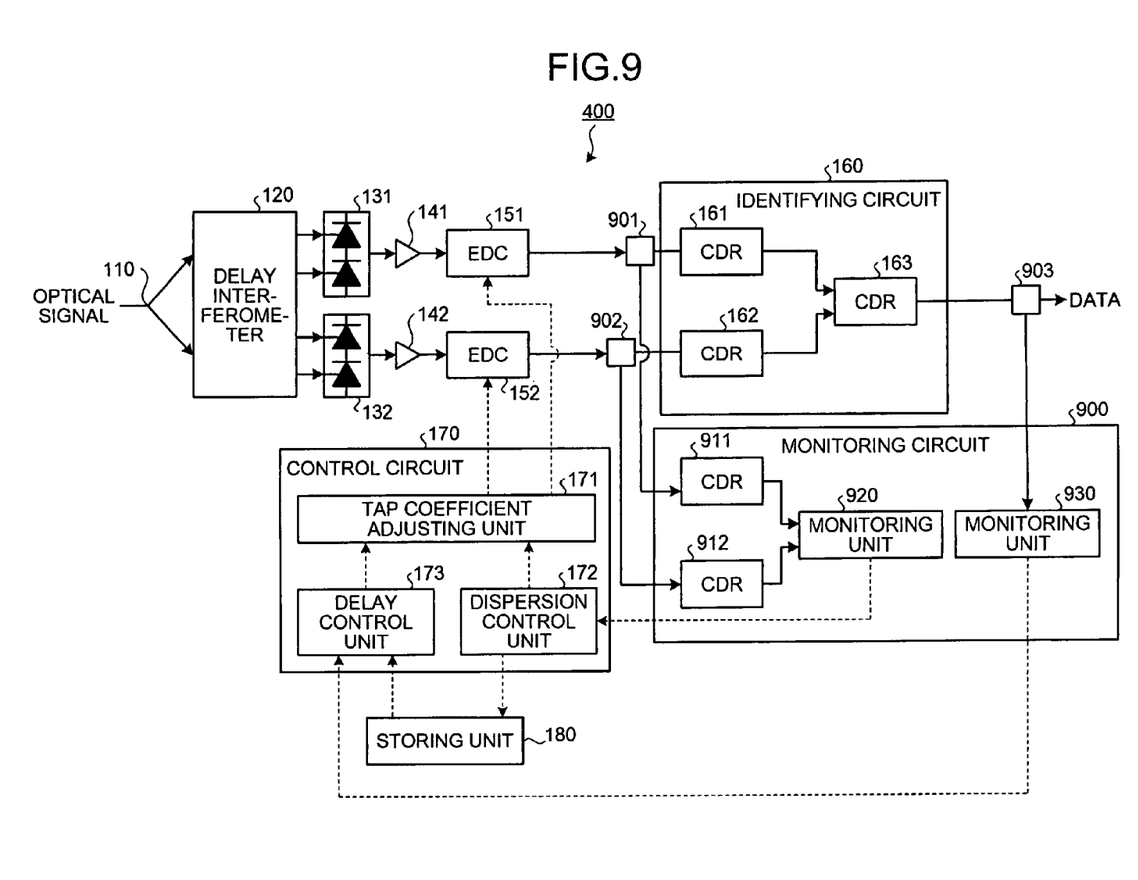
FIG. 9 is a diagram of a functional configuration of an optical receiving apparatus according to a fourth embodiment.

FIG. 9 is a diagram of a functional configuration of an optical receiving apparatus according to a fourth embodiment. As shown in FIG. 9, components identical to the components shown in FIG. 1 are given the same reference numerals and the description thereof is omitted. As shown in FIG. 9, an optical receiving apparatus 400 according to the fourth embodiment includes branching units 901, 902, and 903 and a monitoring circuit 900 instead of the monitoring unit 164 and 165 of the optical receiving apparatus 100 shown in FIG. 1.

The branching unit 901 branches the electrical signal output from the electrical-dispersion compensator 151 to the identifying circuit 160 and outputs the branched signal to the monitoring circuit 900. The branching unit 902 branches the electrical signal output from the electrical-dispersion compensator 152 to the identifying circuit 160 and outputs the branched signal to the monitoring circuit 900. The branching unit 903 branches the electrical signal output from the identifying circuit 160 to an external destination and outputs the branched signal to the monitoring circuit 900.

The monitoring circuit 900 is provided separately from the identifying circuit 160 and is configured by, for example, a CPU. The monitoring circuit 900 includes recovering units 911 and 912, monitoring units 920 and 930. The recovering unit 911 recovers data of the electrical signal output from the branching unit 901 and outputs the data to the monitoring unit 920. The recovering unit 912 recovers data of the electrical signal output from the branching unit 902 and outputs the data to the monitoring unit 920.

The monitoring unit 920 calculates the BER of at least one of the electrical signals output respectively from the recovering units 911 and 912 and outputs the BER(s) to the control circuit 170. The monitoring unit 930 calculates the BER of the electrical signal output from the branching unit 903 and outputs the BER to the control circuit 170. The dispersion control unit 172 of the control circuit 170 adjusts the tap coefficients based on the BER(s) output from the monitoring unit 920. The delay control unit 173 adjusts the tap coefficients based on the BER output from the monitoring unit 930.

The branching units 901, 902, and 903 may respectively be replaced by path switching switches 901, 902, and 903. Before the operation of the optical receiving apparatus 400, each of the path switching switches 901 and 902 outputs to the monitoring circuit 900 the training data output from each of the electrical-dispersion compensators 151 and 152. The path switching switch 903 outputs to the monitoring circuit 900 the training data output from the recovering circuit 163.

During the operation of the optical receiving apparatus 400, each of the path switching switches 901 and 902 outputs to the identifying circuit 160 each electrical signal output from each of the electrical-dispersion compensators 151 and 152. The path switching switch 903 outputs the electrical signal output from the recovering unit 163 to an external destination. Thereby, the control of the dispersion and the control of the delay by the control circuit 170 can be executed without any electrical signal branched for the control by the control circuit 170 and, therefore, power loss of the electrical signals can be suppressed.

As described above, the optical receiving apparatus 400 according to the fourth embodiment can realize the effect of the optical receiving apparatus 100 and, with provision of the monitoring unit 900 that calculates (externally with respect to the identifying circuit 160) the BERs of the electrical signals output from the electrical-dispersion compensators 151 and 152 and the BER of the electrical signal recovered by the recovering unit 163, can facilitate downsizing and increased speed of the identifying circuit 160. Thereby, the operation of identifying signals by the identifying circuit 160 can be stabilized and the receiving property can be improved.

Figure 10:
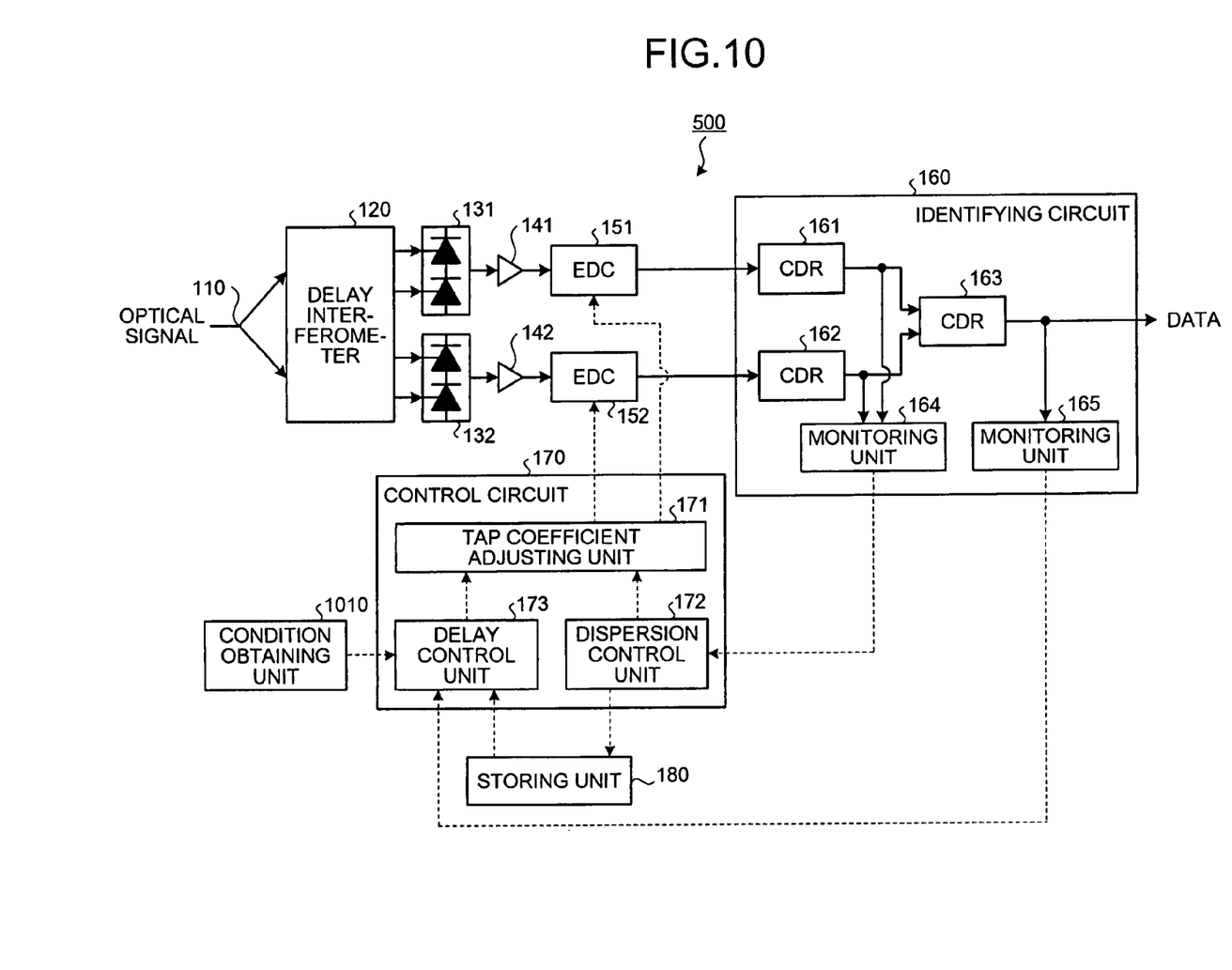
FIG. 10 is a diagram of a functional configuration of an optical receiving apparatus according to a fifth embodiment.

FIG. 10 is a diagram of a functional configuration of an optical receiving apparatus according to a fifth embodiment. As shown in FIG. 10, components identical to the components shown in FIG. 1 are given identical reference numerals and the description thereof is omitted. As shown in FIG. 10, an optical receiving apparatus 500 according to the fifth embodiment includes a condition obtaining unit 1010 in addition to the components of the optical receiving apparatus 100 shown in FIG. 1. The condition obtaining unit 1010 obtains data for a given condition among predetermined conditions.

"Predetermined condition" refers to a condition that is a factor which varies the difference in the delay time of the electrical signals. A predetermined condition is, for example, the temperature inside the optical receiving apparatus 500, variations of the power source, or the operating duration. In the embodiment, a predetermined condition is assumed to be the temperature inside the optical receiving apparatus 500 and the condition obtaining unit 1010 is a heat-sensitive element installed inside the optical receiving apparatus 500.

Each time the delay control unit 173 finely adjusts the tap coefficients of the electrical-dispersion compensators 151 and 152 respectively, the unit 173 generates a table that correlates the tap coefficients being set with temperature data output from the condition obtaining unit 1010. The delay control unit 173 causes the storing unit 180 to store the table generated. The generation of this table may be executed using the training data, etc., before the operation of the optical receiving apparatus 500.

During the operation of the optical receiving apparatus 500, the delay control unit 173 obtains the information concerning the tap coefficients correlated with the temperature data output from the condition obtaining unit 1010, in the table stored in the storing unit 180. Based on the obtained data, the delay control unit 173 finely adjusts the combination of the tap coefficients of the electrical-dispersion compensators 151 and 152. At this time, the operation of each of the monitoring units 164 and 165 may be stopped and the tap coefficients may be finely adjusted based on only the temperature data output from the condition obtaining unit 1010.

Figure 11:
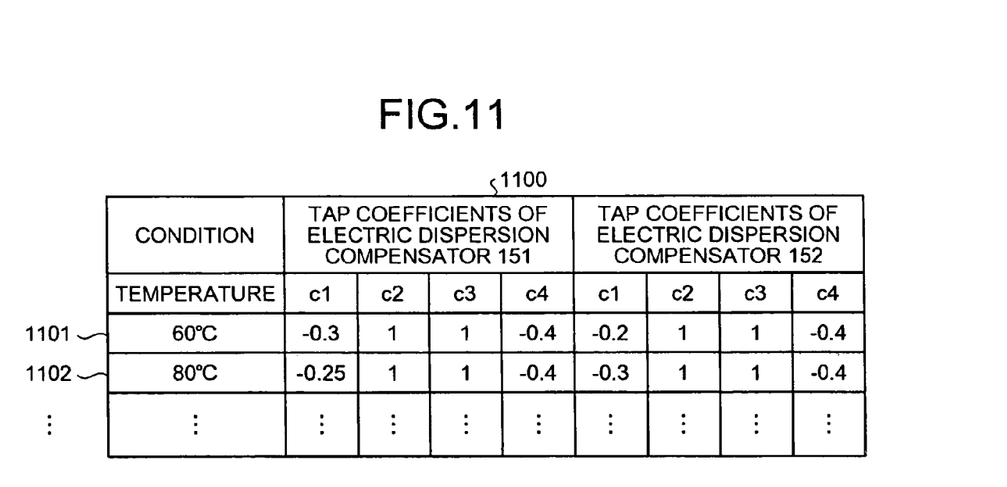
FIG. 11 is a chart of an example of a table stored in the storing unit.

FIG. 11 is a chart of an example of a table stored in the storing unit. As shown in FIG. 11, a table 1100 generated by the delay control unit 173 and stored in the storing unit 180 includes plural combinations of the tap coefficients that are for the electrical-dispersion compensators 151 and 152 and are respectively correlated with predetermined conditions. Each of the combinations 1101, 1102, etc., is a combination of the tap coefficients respective to the temperature indicated by the temperature data output from the condition obtaining unit 1010, such as 60° C., 80° C., etc.

The relationship between the tap coefficients of the electrical-dispersion compensator 151 and the tap coefficients of the electrical-dispersion compensator 152 is different for each of the combinations 1101, 1102, etc. Therefore, the selection of any one of the combinations 1101, 1102, etc., and the setting of the combination of the tap coefficients for the electrical-dispersion compensators 151 and 152, enables different delay amounts to be provided respectively to the electrical signals that pass through the electrical-dispersion compensators 151 and 152.

The relative delay amount of each electrical signal can be controlled by changing the combination selected from among the combinations 1101, 1102, etc. By selecting a combination correlated with the temperature data output from the condition obtaining unit 1010 from the combinations 1101, 1102, etc. and setting the combination of the tap coefficients for the electrical-dispersion compensators 151 and 152, the difference in the delay time of the electrical signals can be controlled without operating the monitoring unit 165 during the operation of the optical receiving apparatus 500.

As described above, the optical receiving apparatus 500 according to the fifth embodiment can realize the effect of the optical receiving apparatus 100 and, by storing in the storing unit 180 the table including the combinations of the tap coefficients respectively correlated with predetermined conditions, the difference in the delay time of the electrical signals can be controlled without operating the monitoring unit 165. Thereby, the operation of identifying signals by the identifying circuit 160 can be stabilized and the receiving property can be improved.

As described above, each of the optical receiving apparatuses according to the embodiments can control the dispersion compensation amount by adjusting the tap coefficients of the electrical-dispersion compensators 151 and 152 and can improve the receiving property thereof by compensating the difference in the delay time of the electrical signals by finely adjusting the tap coefficients of the electrical-dispersion compensators 151 and 152.

Each of the embodiments above has been described assuming that the optical receiving apparatus is a receiving apparatus that receives an optical signal transmitted in the DQPSK scheme. However, the modulation scheme that the optical receiving apparatus supports is not limited to the DQPSK scheme. The optical receiving apparatus according to the embodiments can be generally applied to optical receiving apparatuses that compensate respectively the dispersion of each electrical signal obtained by branching an optical signal and photo-electric converting the branched signal, and that identify the data of the optical signal based on each dispersion compensated electrical signal.

The case where the comparisons of the BER respectively with the first and the second threshold values are executed has been described in each of the embodiments above. However, because the variation of BER usually becomes small as the BER becomes low, comparisons of the variation of BER with the first and the second threshold values may be executed.

The case where each of the electrical-dispersion compensators 151 and 152 is configured by the transversal filter has been described in each of the embodiments above. However, each of the electrical-dispersion compensators 151 and 152 is not limited to a transversal filter and may be a filter that can execute the process identical to that of the transversal filter.

According to the embodiments described above, control of the dispersion compensation amount by adjusting the tap coefficients of a transversal filter constituting the dispersion compensating unit and control of the differences in delay time among electrical signals by finely adjusting the tap coefficients of the transversal filter is enabled. An improvement of the receiving property by compensating the differences in delay time among the electrical signals is also effected.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electrical-dispersion compensating apparatus that respectively compensates dispersion of electrical signals obtained by branching an optical signal into branched signals and photo-electric-converting the branched signals, the electrical-dispersion compensating apparatus comprising:
   a dispersion filter that has a plurality of taps for compensating dispersion of each of the electrical signals;
   a dispersion controller that controls a dispersion compensation amount for each of the electrical signals by adjusting tap coefficients of the dispersion filter; and
   a delay controller that controls a difference in delay time of the electrical signals by adjusting the tap coefficients adjusted by the dispersion controller.

2. The electrical-dispersion compensating apparatus according to claim 1, wherein
   the dispersion controller adjusts the tap coefficients respectively to predetermined coefficients based on a property of the dispersion filter.

3. The electrical-dispersion compensating apparatus according to claim 1, wherein
   the delay controller adjusts the tap coefficients of taps at both ends of a sequence of the taps.

4. An optical receiving apparatus comprising:
an electrical-dispersion compensating apparatus that respectively compensates dispersion of electrical signals obtained by branching an optical signal into branched signals and photo-electric-converting the branched signals and includes
a dispersion filter that has a plurality of taps for compensating dispersion of each of the electrical signals,
a dispersion controller that controls a dispersion compensation amount for each of the electrical signals by adjusting tap coefficients of the dispersion filter, and
a delay controller that controls a difference in delay time of the electrical signals by adjusting the tap coefficients adjusted by the dispersion controller; and
a data recovery circuit that identifies data of the optical signal based on the electrical signals that have been subjected to dispersion compensation by the dispersion filter.

5. The optical receiving apparatus according to claim 4, wherein
the data recovery center includes
a first data recovery circuit that respectively recovers, as data signals, the data from each of the electrical signals that have been subjected to dispersion compensation; and
a second data recovering circuit that recovers the data of the optical signal as a data signal and based on the data signals recovered by the first data recovery circuit,
the dispersion controller adjusts the tap coefficients based on an error rate of each of the data signals recovered by the first data recovery circuit, and
the delay controller adjusts the tap coefficients based on an indicator of the difference in the delay time of the electrical signals.

6. The optical receiving apparatus according to claim 5, wherein
the dispersion controller adjusts the tap coefficients such that an error rate of each of the electrical signals becomes equal to or less than a first threshold value, and
the delay controller, to an extent that the error rate of each of the electrical signals is equal to or less than the first threshold value, adjusts the tap coefficients such that the indicator becomes equal to or less than a second threshold value.

7. The optical receiving apparatus according to claim 5, further comprising:
a memory that stores a list of the tap coefficients with which the error rate of each of the electrical signals becomes equal to or less than the first threshold value, wherein
the delay controller sets, based on the list stored in the memory, the tap coefficients such that the indicator becomes equal to or less than the second threshold value.

8. The optical receiving apparatus according to claim 5, wherein
the dispersion controller generates a list of the tap coefficients with which the error rate of each of the electrical signals becomes equal to or less than the first threshold value and causes a memory to store the list generated.

9. The optical receiving apparatus according to claim 5, wherein
the delay controller adjusts the tap coefficients based on, as the indicator, the error rate of the data signal recovered by the second data recovery circuit.

10. The optical receiving apparatus according to claim 5, further comprising:
a detector that detects the difference in the delay time of the electrical signals that have been subjected to dispersion compensation by the dispersion filter, wherein
the delay controller adjusts the tap coefficients based on, as the indicator, the difference in the delay time detected by the detector.

11. The optical receiving apparatus according to claim 5, further comprising:
a clock recovery circuit that recovers a clock signal from each of the electrical signals that have been subjected to dispersion compensation by the dispersion filter; and
a detector that detects a difference in delay time of the clock signals recovered by the clock recovery circuit, wherein
the delay controller adjusts the tap coefficients based on, as the indicator, the difference in the delay time detected by the detector.

12. The optical receiving apparatus according to claim 5, further comprising:
a memory that stores a table correlating the tap coefficients respectively with data for a predetermined condition; wherein
the delay controller sets the tap coefficients using the tap coefficients respectively correlated with data for a predetermined condition.

13. The optical receiving apparatus according to claim 5, wherein
the dispersion filter includes, as the filter
a first filter, and
a second filter,
the first filter and the second filter compensate the dispersion of the electrical signals, respectively,
the dispersion controller adjusts the tap coefficients of the first filter and the second filter, respectively, and
the delay controller adjusts a combination of the tap coefficients of the first filter and the tap coefficients of the second filter.

14. The optical receiving apparatus according to claim 13, wherein
the dispersion controller adjusts the tap coefficients of the first filter based on an error rate of an electrical signal subjected to dispersion compensation by the first filter, and adjusts the tap coefficients of the second filter based on an error rate of an electrical signal subjected to dispersion compensation by the second filter.

15. An optical receiving method of respectively compensating dispersion in electrical signals obtained by branching an optical signal into branched signals and photo-electric converting the branched signals, the optical receiving method comprising:
compensating dispersion of each of the electrical signals using a filter having a plurality of taps;
controlling a dispersion compensation amount for each of the electrical signals by adjusting tap coefficients at the compensating of the dispersion;
controlling a difference in delay time of the electrical signals by adjusting the tap coefficients adjusted at the controlling of the dispersion compensation amount; and
identifying data of the optical signal based on each of the electrical signals that have been subjected to dispersion compensation at the compensating of the dispersion.

* * * * *